Aug. 31, 1965 R. L. HAND, JR 3,204,102
ELEVATION FINDER FOR INFRARED DEVICE
Filed Jan. 24, 1963 3 Sheets-Sheet 1

INVENTOR.
ROSS L. HAND, JR.
BY
*George C. Sullivan*
Agent

Aug. 31, 1965  R. L. HAND, JR  3,204,102
ELEVATION FINDER FOR INFRARED DEVICE
Filed Jan. 24, 1963  3 Sheets-Sheet 2
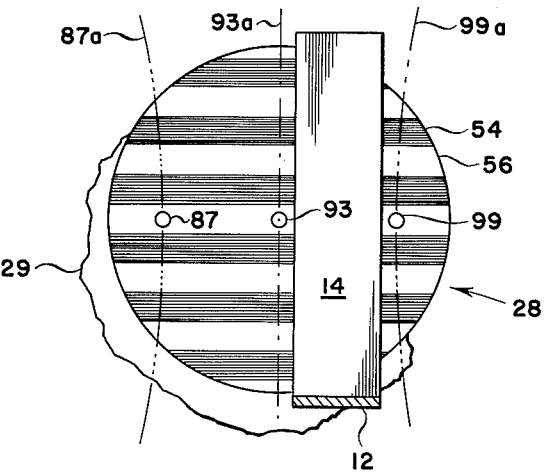
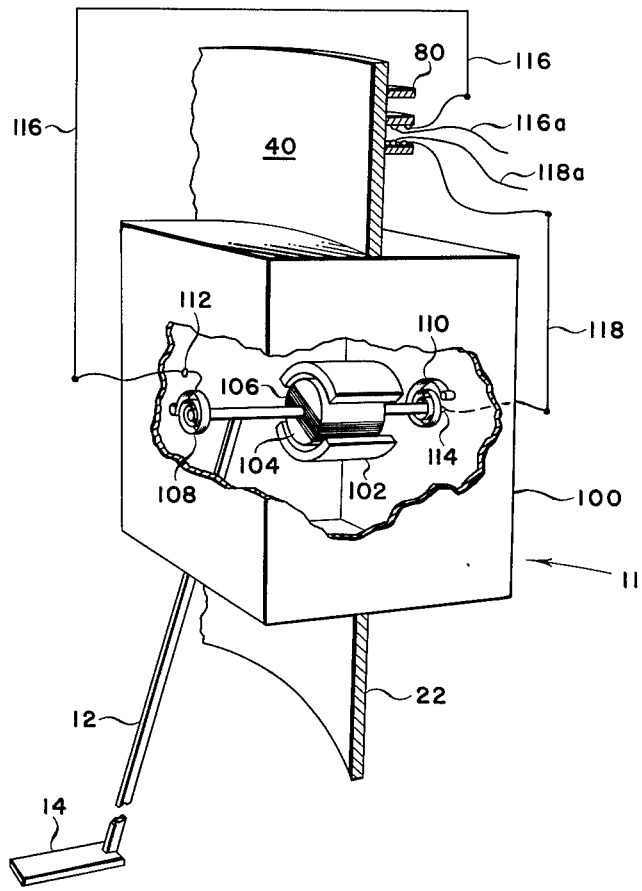
INVENTOR.
ROSS L. HAND, JR.
BY
Agent Aug. 31, 1965  R. L. HAND, JR  3,204,102
ELEVATION FINDER FOR INFRARED DEVICE
Filed Jan. 24, 1963  3 Sheets-Sheet 3

INVENTOR.
ROSS L. HAND, JR.
BY
George C. Sullivan
Agent 3,204,102
ELEVATION FINDER FOR INFRARED DEVICE
Ross L. Hand, Jr., Sun Valley, Calif., assignor to Lockheed
Aircraft Corporation, Burbank, Calif.
Filed Jan. 24, 1963, Ser. No. 253,572
12 Claims. (Cl. 250—83.3)

This invention relates to an elevation finder for an infrared search device and more particularly to an elevation finder which permits determining the angle of elevation of a target detected by an infrared search device which employs but a single infrared detector cell.

Infrared search devices typical of the prior art include a diagonal mirror which is rotatable through 360° in azimuth and which may be adjusted to receive target energy over a limited range in elevation from different elevational sectors. The target energy is reflected by the diagonal mirror through an objective lens system which focuses the target energy onto a reticle. A field lens system receives energy from the reticle and focuses it onto an array of infrared detectors. If the target energy originates from near the top of a particular elevational sector, it will be reflected through the reticle near one edge thereof. If the target energy is received from near the center of the elevational sector, it will be reflected through the center of the reticle. If the target energy is reflected from near the lower end of the elevational sector, it will be reflected through the other edge of the reticle. A number of infrared detectors comprising the array are positioned with respect to the reticle in such a manner that each one receives reflected target energy only from a predetermined section of the reticle and will, therefore, give an indication of the elevation of the target radiating the energy. With this system, the angular resolution in elevation is limited to the total elevational field divided by the number of cells employed. A separate amplifier is required for each detector cell which not only complicates the system, but adds materially to its cost.

In the device of the present invention, on the other hand, but a single infrared detector cell is employed to receive reflected target energy from all sections of the reticle and inexpensive means are employed to determine the elevation of the target. These means include a wand which is moved over the reticle in such a manner that it blocks the target's image. Since, as pointed out above, the energy reflected by the diagonal mirror strikes the reticle at a point determined by the elevation of the target energy, the location of the wand with respect to the reticle is a function of the elevation of the target.

The device of the present invention was disclosed generally in co-pending application Serial No. 188,444, filed April 18, 1962, by the assignee of the instant application. Since the device of the present invention was not claimed separately in said co-pending application, it is the purpose of the present application to describe the device in detail and claim it as an individual unit.

It is a primary object of the present invention to provide an elevation finder for an infrared search device which permits reading target elevation angles with a single infrared detector.

It is another object of the present invention to provide an elevation finder for an infrared search device which increases angular resolution in the vertical direction.

Yet another object of the present invention is to provide an elevation finder for an infrared search device which employs a wand to blank out areas of the reticle of an infrared search device in accordance with a predetermined program.

A further object of the invention is to provide a search device of the type described which is economical to manufacture and requires a minimum of upkeep and maintenance in use.

In accordance with the present invention, a remotely driven motor element with position feedback is mounted in an infrared search device superjacent its reticle. The motor element drives the wand across the field of view to cut off energy from the target so that it will not pass through the reticle on to the detector. An indicator is provided which displays the position of the wand in terms of elevation of the target when blocking occurs. The features of the present invention which are believed to be novel are set forth with particularity in the appended claims.

The present invention, both as to its organization and manner of operation, together with further objects and advantages thereof, may best be understood by reference to the following description, taken in connection with the accompanying drawings, in which:

FIGURE 2 is a horizontal, cross-sectional view taken along line 2—2 of FIGURE 1;

FIGURE 3 is a perspective view, on an enlarged scale, of a portion of the device of FIGURE 1;

Figure 1:
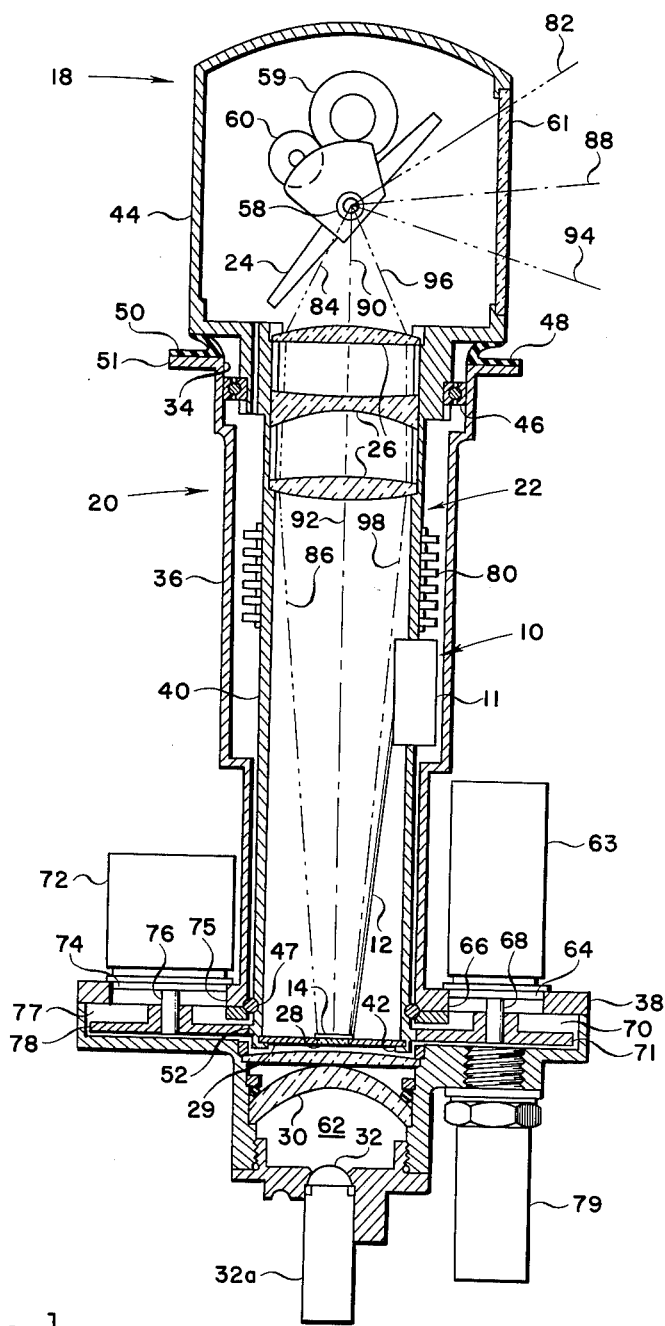
FIGURE 1 is a vertical cross-sectional view of an infrared search device employing an elevation finder of the present invention.

Referring again to the drawings, and particularly to FIGURES 1 and 2, the elevation finder of the present invention, generally designated 10, includes a motor element 11 which closely resembles the meter movement of a voltmeter and is used to drive a wand 12 having a foot portion 14. The motor element 11 is mounted in a rotating search device 13 which includes, generally, a fixed housing 20, a rotatable housing 22, a tiltable or diagonal mirror 24, an objective lens system 26, a reticle 28, a field lens system 30 and an infrared detector 32.

The fixed housing 20 has an open, flanged top 34, an encompassing sidewall 36 and a base portion 38.

The rotatable housing 22 includes an encompassing sidewall 40, an open bottom 42, and an upper head portion 44 and is rotatably mounted on bearings 46 and 47, respectively, in fixed housing 20 with the head portion 44 extending out the open top thereof. Typically, a rotatable, flexible seal 48 is rigidly affixed to the head 44 for rotation therewith and includes an annular lip portion 50 which forms a wiping contact with the flange 51 of flanged open top 34 to prevent foreign matter from entering housing 20. The lower end of rotatable housing 22 carries a ring gear 52 about its outer periphery and has the reticle 28 mounted in its open end 42. The reticle 28 has alternating opaque and infrared transmitting grids 54 and 56 and rotates with housing 22.

The mirror 24 is swingably mounted on a shaft 58 in head 44 and is tilted by means of an indexing motor 59 which also drives a position indicating potentiometer 60. A window 61 is mounted in head 44 in alignment with mirror 24 for admitting infrared target energy thereto. The objective lens system 26 is mounted in the upper end of the rotatable housing 22 subjacent the mirror 24 to receive reflected target energy and focus it onto reticle 28. The field lens system 30 is mounted in a cylindrical cavity 62 at the lower end of base portion 38 to receive energy from reticle 28 and focus it onto the infrared detector 32, which is mounted subjacent the lens system 30.

An electric motor 63 includes a threaded collar 64 which threadedly engages a threaded aperture 66 in base portion 38 and has a shaft 68 which depends into a cavity 70 in base portion 38. A drive gear 71 is keyed to shaft 68 and is in driving engagement with ring gear 52 to rotate housing 22. An azimuth resolver 72 has a threaded collar 74 which threadedly engages a threaded aperture 75 in base portion 38 and carries a shaft 76 which depends into a cavity 77 in base 38. A driven gear 78 is keyed to shaft 76 and is driven by the ring gear 52. A desiccant container 79 is also mounted in base 38 in communication with the interior of housing 22 and is adapted to contain a desiccant for maintaining a dry condition in the interior of the search device 18. Slip rings 80 are affixed to the encompassing sidewall 40 of rotatable housing 22 and carry electrical current in a system to be hereinafter described.

When the mirror 24 is tilted to cover a predetermined elevational sector, target energy entering the window 61 from an angle in elevation represented by the broken line 82 will be reflected from mirror 24 along line 84 and pass through the objective lens system from whence it travels along a line 86 to strike the reticle 28 near one edge thereof forming an image, as indicated at 87 in FIGURE 2. As housing 22 rotates in azimuth, the image 87 scans across the edge of reticle 28 along a path represented by line 87a. Target energy entering window 61 from an angle in elevation represented by broken line 88 will strike mirror 24 and be reflected therefrom along broken line 90 through the objective lens system 26 from whence it travels along a line 92 to contact the reticle 28 near its center forming an image 93 which will scan across reticle 28 along a path represented by broken line 93a. Target energy entering window 61 from an angle in elevation represented by broken line 94 will strike mirror 24 and be reflected therefrom along broken line 96 through the objective lens system 26 from whence it travels along a path defined by broken line 98 onto reticle 28 near the outer edge thereof forming an image 99 which will scan across reticle 28 along a path defined by broken line 99a.

The field lens system 30 focuses target energy from reticle 28 onto the infrared detector 32 regardless of the portion of the reticle contacted by the energy. Whenever infrared detector 32 detects target energy from reticle 28, it emits a signal which is amplified by an amplifier 32a. Signals from amplifier 32a may be displayed on a suitable display unit, which is not shown, but which may be similar to that disclosed in co-pending application Serial No. 188,444. The detector 32 will not indicate the elevational angle of the target energy, but merely indicates that target energy is being received from a target having an elevation within the elevational sector covered by the mirror 24 at its predetermined tilt. Therefore, wand 12 must be moved across reticle 28 until it blocks the target energy and thereby interrupts the signal from detector 32. Then the elevational angle is determined, by means to be hereinafter described, from the position of foot portion 14 relative to reticle 28. Since mirror 24 rotates in azimuth, energy from a particular target will be reflected cyclically for brief periods of time. If foot portion 14 were extremely narrow, it would require several revolutions of mirror 24 before foot portion 14 could be positioned to intercept the target energy. Consequently, foot portion 14 is preferably of sufficient width to block approximately one-third of reticle 28. Then the complete surface of the reticle can be scanned in such a manner that the target energy will be blocked within three revolutions. Once blocking occurs, the leading edge 14a of foot portion 14 can be employed to sense the exact location of the target energy with respect to reticle 28.

Referring now to FIGURE 3, the motor element 11 is mounted in the encompassing sidewall 40 of rotatable housing 22 and includes a housing 100 in which is mounted a permanent magnet 102 and a moving coil 104. The coil 104 surounds core 106 and is pivotally mounted in housing 100 and to which wand 12 is attached. Current-carrying control springs 108 and 110 are connected to coil 104 with one end and have their other ends connected to electrical terminals 112 and 114, respectively. Electrical leads 116 and 118 connect the terminals 112 and 114, respectively, to slip rings 80 of FIGURE 1 and leads 116a and 118a connect leads 116 and 118 in a circuit to be hereinafter described.

Figure 4:
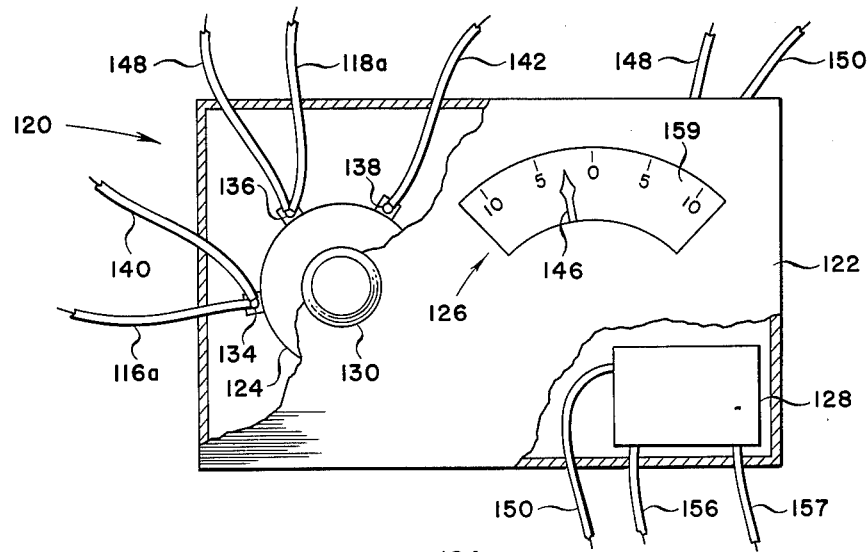
FIGURE 4 is a plan view of a control panel employed with the elevation finder of the invention.
Figure 5:
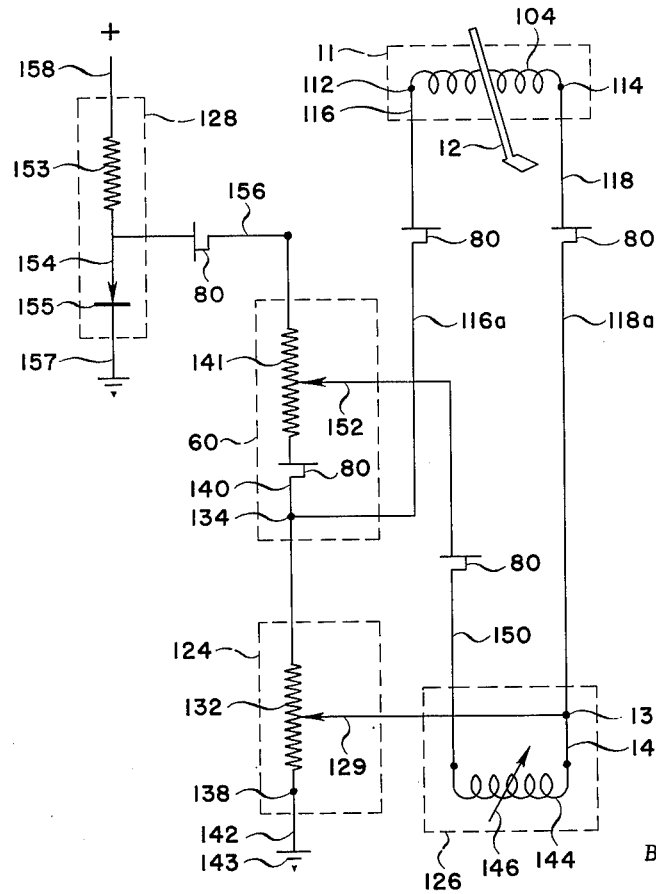
FIGURE 5 is a wiring diagram of the elevation finder of the invention.

Referring now to FIGURES 4 and 5, a remote control and display system 120 is provided to control the operation of the elevation finder 10 and to display the position of wand 12 relative to reticle 28 in terms of elevational degrees. The system 120 includes a panel 122 in which is mounted a potentiometer 124, an elevation indicator 126 and a voltage regulator 128. The potentiometer 124 includes a moving contact 129 (FIGURE 5) which is positionable by a control knob 130 along a resistance element 132. Potentiometer 124 also includes terminals 134, 136 and 138 which are connected to one end of resistance element 132, sliding contact 129, and the other end of resistance element 132, respectively. An electrical lead 140 connects the terminals 134 to the resistance element 141 of potentiometer 60 through slip rings 80 and a lead 142 connects the terminal 138 to a suitable ground 143. The leads 116a and 118a from slip rings 80 are connected to terminals 134 and 136, respectively, to place motor element 11 in a circuit with potentiometer 124.

The indicator 126 comprises a voltmeter which is similar in construction to the motor element 11 and which includes a coil 144 and a pointer 146. A lead 148 connects one end of the coil 144 to terminal 136 and a lead 150 connects the other end of coil 144 to the movable contact 152 of potentiometer 60 through slip rings 80.

The voltage regulator 128 comprises a fixed resistance element 153, an anode 154 and a cathode 155 and is connected in the system by means of a first lead 156, which connects the voltage regulator 128 to resistor 141 through slip rings 80, a second lead 157, which connects the voltage regulator to a suitable ground, and a third lead 158 which may be connected to a suitable source of electromotive force, not shown.

The indicator 126 includes a dial 159 which is calibrated in degrees elevation. Since the coil 144 of indicator 126 is connected to the movable contact 152 of potentiometer 60 and to movable contact 129 of potentiometer 124, its reading will be affected by both the potentiometer 60 and the control knob 130. Therefore, when potentiometer 60 is driven by indexing motor 59 as it increases the field of the mirror 24, the indicator 126 will have an increased reading. Conversely, should the field of mirror 24 be decreased, indicator 126 will have a decreased reading. The coil 104 of motor element 11 is also connected to the contact 129 of potentiometer 124 so that rotation of knob 130 will move the wand 12 across reticle 28. Since coil 104 is also connected in the circuit with indicator coil 144, the relative position of wand 12 will be reflected in degrees elevation on indicator 126.

Operation of the device will be readily understood. The indexing motor 59 is employed to position the mirror 24 with a predetermined amount of tilt which is reflected by potentiometer 60 onto meter 126 in terms of degrees elevation with respect to a predetermined zero position. Target energy entering window 61 is reflected by mirror 24 through reticle 28 causing detector 32 to emit a signal which is transmitted by amplifier 32a to a suitable display unit, not shown, which indicates that a target has been intercepted from an elevational angle within the predetermined elevational sector covered by the diagonal mirror. The operator of the elevation finder 10 may then manipulate dial 130 moving movable contact 129 across resistance element 132 and causing wand 12 to scan across the field of view of reticle 28 to cut off energy from the target. As soon as foot portion 14 of wand 12 cuts off the energy from the target, detector 32 will no longer emit a signal and the operator can then determine the elevation of the target from the indicator 126.

While the particular elevation finder herein shown and described in detail is fully capable of obtaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A device for determining the elevational angle of infrared target energy which is received from a source within a predetermined elevational sector, said device comprising:
   (a) a wand adopted to be moved and positionable within said predetermined sector to block said target energy; and
   (b) position indicating means connected to said wand for indicating its blocking position within said predetermined sector in terms of elevational degrees.

2. The device of claim 1 wherein said wand is positioned by a motor element comprising a moving coil suspended between the poles of a permanent magnet, said coil including a core, said wand being connected to said coil and being positioned within said sector by a change in potential across said coil.

3. The device of claim 2 wherein said position indicating means comprises a voltmeter having its coil connected to the coil of said motor element.

4. In combination with an infrared search device including a diagonal mirror for receiving target energy from a predetermined elevational sector, an infrared detector cell positioned subjacent said mirror for receiving reflected target energy therefrom, and a reticle located between said mirror and said cell, said reflected energy striking said cell after passing through a reticle at points determined by the elevation of said target energy within said predetermined sector, said cell emitting a signal when target energy strikes any point thereon, an elevation finder comprising:
   (a) a wand positionable with respect to said reticle to block said energy from said cell;
   (b) means for positioning said wand at a location with respect to said reticle at which said wand blocks the energy directed to said cell from said target; and
   (c) means for indicating the position of said wand to provide an indication of the elevation of said target.

5. The elevation finder of claim 4 wherein said wand comprises a flat plate movable bodily over said reticle in a plane substantially parallel to the surface of said reticle.

6. The elevation finder of claim 5 wherein said plate is wide enough to block said reflected energy from approximately one-third of said predetermined sector when said plate is in any particular position with respect to said reticle.

7. The elevation finder of claim 6 wherein said plane includes a leading edge extending across said cell, said leading edge being positionable to pinpoint the elevation of said target once blocking occurs.

8. The elevation finder of claim 4 wherein said wand is positioned by means of a motor element having a rotatable shaft and comprises an arm having one end connected to said shaft and another end extending to a point closely adjacent said reticle, and a flat plate portion connected to said other end and forming substantially a right angle therewith, said plate extending over said reticle in a plane substantially parallel thereto.

9. In combination with an infrared search device including a diagonal mirror positionable to receive target energy from a predetermined elevational field, a first position indicating potentiometer for indicating the position of said mirror within said field, a reticle positioned subjacent said mirror for receiving reflected energy therefrom, said reflected energy striking said reticle at points determined by the elevation of said target energy within said predetermined field and an infrared detector cell mounted subjacent said reticle for emitting a signal when target energy is received from any point on said reticle, an elevation finder comprising:
   (a) electric motor means having a wand positionable with respect to said reticle for blocking said energy from said cell;
   (b) position feedback means connected to said electric motor means for sensing the position of said wand with respect to the point on said reticle at which said energy is blocked; and
   (c) indicator means connecting said position feedback means and said first potentiometer in an electrical circuit, said indicator means including a meter element having a pointer and also having a scale which is graduated in elevational degrees, said pointer being positionable over said scale by said position feedback means and said first potentiometer to indicate the elevation of said target energy.

10. The elevation finder of claim 9 wherein said electric motor means comprises a motor element having its coil connected to said position feedback means.

11. The elevation finder of claim 9 wherein said position feedback means comprises a second potentiometer having its sliding contact connected to the coil of said motor element.

12. The elevation finder of claim 11 wherein said indicator means comprises a voltmeter having its coil connected to the sliding contacts of said first and second potentiometers and to the coil of said motor element.

References Cited by the Examiner

UNITED STATES PATENTS

| | | | |
|---|---|---|---|
| 3,057,953 | 10/62 | Guerth | 88—1 X |
| 3,084,253 | 4/63 | McHenry et al. | 250—83.3 |

RALPH G. NILSON, *Primary Examiner.*

ARCHIE R. BORCHELT, *Examiner.*